United States Patent [19]

Fennel et al.

[11] Patent Number: 5,704,766

[45] Date of Patent: Jan. 6, 1998

[54] METHOD AND CIRCUIT ARRANGEMENT FOR CONTROLLING THE FLOW RATE OF A HYDRAULIC PUMP

[75] Inventors: Helmut Fennel, Bad Soden; Alexander Kolbe, Gross-Zimmern; Klaus Honus, Frankfurt am Main, all of Germany

[73] Assignee: ITT Automotive Europe GmbH, Frankfurt, Germany

[21] Appl. No.: 406,897

[22] PCT Filed: Aug. 20, 1993

[86] PCT No.: PCT/EP93/02226

§ 371 Date: Aug. 21, 1995

§ 102(e) Date: Aug. 21, 1995

[87] PCT Pub. No.: WO94/07717

PCT Pub. Date: Apr. 14, 1994

[30] Foreign Application Priority Data

Sep. 25, 1992 [DE] Germany .................... 42 32 130.1

[51] Int. Cl.⁶ .................................................. F04B 49/00
[52] U.S. Cl. ............................... 417/42; 417/53; 303/10; 303/116.4
[58] Field of Search ..................... 417/42, 44.1, 45, 417/53; 303/10, 11, 116.4

[56] References Cited

U.S. PATENT DOCUMENTS

| | | | |
|---|---|---|---|
| 4,399,200 | 8/1983 | Galloway | 429/23 |
| 4,975,852 | 12/1990 | Fennel et al. | 363/426.02 |
| 5,131,730 | 7/1992 | Kollers et al. | 303/113 TR |
| 5,188,440 | 2/1993 | Muller et al. | 303/116.2 |
| 5,222,787 | 6/1993 | Eddy et al. | 303/10 |

FOREIGN PATENT DOCUMENTS

| | | |
|---|---|---|
| 0 270 474 | 6/1988 | European Pat. Off. . |
| 0 296 444 | 12/1988 | European Pat. Off. . |
| 0 460 408 | 12/1991 | European Pat. Off. . |
| 0 543 419 | 5/1993 | European Pat. Off. . |
| 2 706 230 | 8/1978 | Germany . |
| 3 013 402 | 10/1981 | Germany . |
| 3221146 | 12/1983 | Germany . |
| 3 241 039 | 5/1984 | Germany . |
| 3 314 823 | 10/1984 | Germany . |
| 3 437 091 | 4/1986 | Germany . |
| 3 819 490 | 12/1989 | Germany . |
| 4 020 449 | 1/1992 | Germany . |
| 4 037 142 | 5/1992 | Germany . |
| 4 110 494 | 10/1992 | Germany . |

OTHER PUBLICATIONS

Brochure: Motor Control Seminar 1986. SGS Halbleiter Bauelemente GmbH, Postfach 1180, 8018 Grafing b. Munchen.

English translation (labelled PCT 7168) of the PCT International Application which was filed based on German reference DE 4 110 494.

*Primary Examiner*—Timothy Thorpe
*Assistant Examiner*—Peter G. Korytnyk
*Attorney, Agent, or Firm*—Thomas N. Twomey; J. Gordon Lewis

[57] ABSTRACT

Method and circuit configuration for controlling the flow rate of an electromotively driven hydraulic pump which is activated by a variable pulse/pulse-break train for controlling the auxiliary pressure supply of a brake system including anti-lock control (ABS) and traction slip control by brake management (BASR). The generator voltage produced by the pump motor during times of pulse break is evaluated as a standard of the rotational speed of the pump. The nominal value of the pump speed is compared with the actual value of the pump speed in a control circuit, and the new correcting variable for the pump activation is derived from the difference.

4 Claims, 3 Drawing Sheets

Fig. 3A
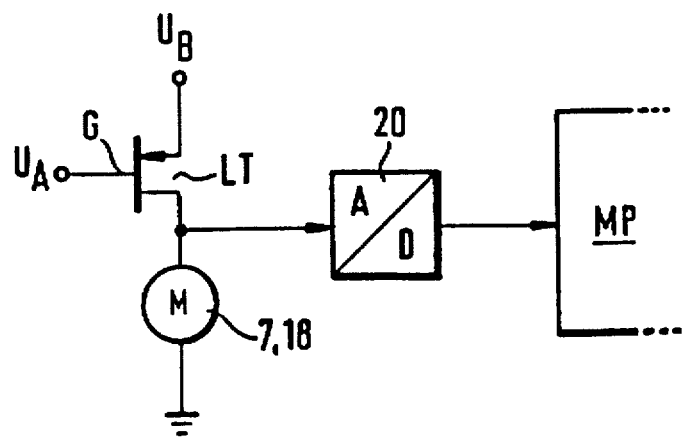
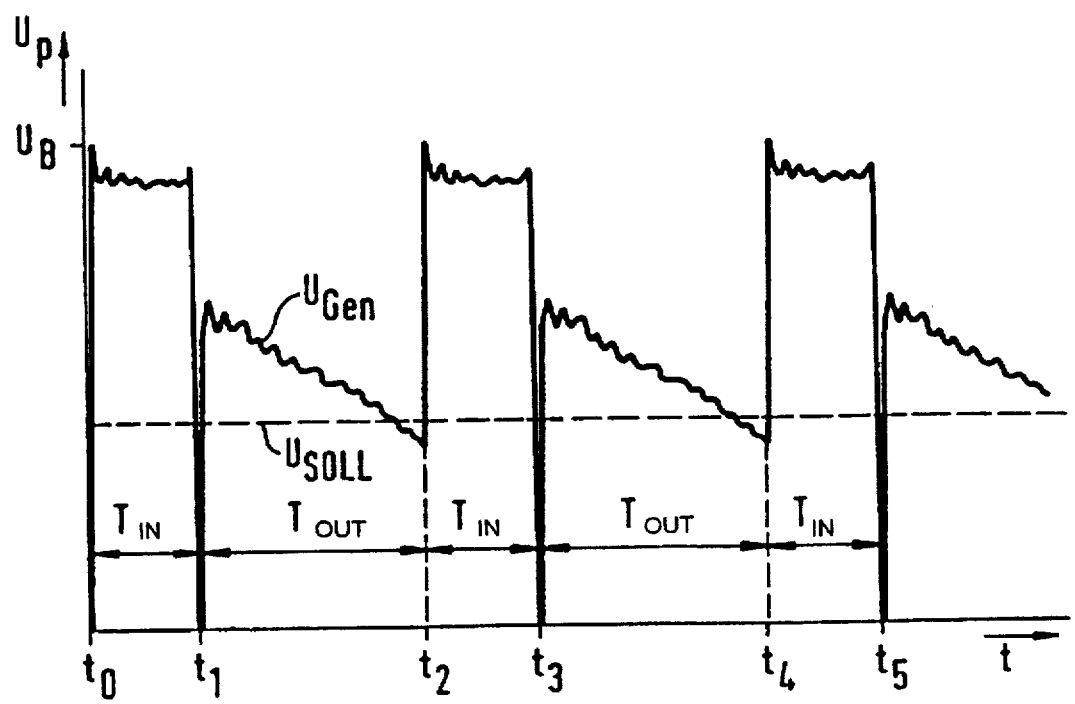
Fig. 3B

METHOD AND CIRCUIT ARRANGEMENT FOR CONTROLLING THE FLOW RATE OF A HYDRAULIC PUMP

This application is the U.S. national-phase application of PCT International Application No. PCT/EP93/02226.

BACKGROUND OF THE INVENTION

The present invention relates to a method of adjusting the flow rate of an electromotively driven hydraulic pump of a brake system including anti-lock control (ABS) and traction slip control by brake management (BASR) to the instantaneous requirements, wherein the hydraulic pump is activated by a pulse train having variable pulse times and/or times of pulse break. A circuit configuration for implementing the method is also included in the present invention.

Adjusting the flow rate of pumps of this type to the requirements involves difficulties if the parameters, which determine the flow rate, vary within wide limits and the value, required in the respective situation, is to be adjusted as precisely as possible. For example, it is a problem with hydraulic brake systems including anti-lock control and traction slip control by brake management to decrease to the greatest extent possible the rotational speed of the pump with a view to minimizing noises. An extremely large number of interferences affect the rotational speed of the pump in brake systems for automotive vehicles: (a) there is a wide range of temperatures, (b) the supply voltage (i.e. battery voltage) depends on the charging condition and the age of the battery, and (c) the counterpressure, in opposition to which the pump delivers fluid, depends on the prevailing situation. Further, for safety reasons, a minimum value safeguarding the function of the brake system must fall short of whatever situation occurs.

Attempts have been made to reduce the flow rate of pumps used on brake systems by activating a series resistance in the case of traction slip control by brake management because, principally, less energy is required for a traction slip control operation by brake management than for an anti-lock control operation. Activation of the pump pulsed in response to the requirements with a view to reducing the rotational speed and, thus, noises during a traction slip control operation by brake management, has also been taken into consideration (e.g. DE 41 10 494 A1). However, due to the above-mentioned variable parameters and for safety reasons, a large "reserve volume" must be taken into account in any case, with the result that the pump, generally, must be adjusted to a higher flow rate than the flow rate actually required.

DE-A-3 241 039 discloses a brake force control unit for an automotive vehicle which has an anti-lock system (ABS) and a brake power booster (BKV). The two systems (ABS and BKV) have a common hydraulic unit with an electrically driven hydraulic pump. Because the pressure fluid requirements during anti-lock operation are increased greatly compared to partial braking operations, the drive motor of the hydraulic pump is activated by means of a series resistance in the absence of the ABS mode, when exclusively the brake power booster is used. This takes into account that the power requirement of the brake power booster is, e.g., 1 watt, while the power requirement of the ABS is, e.g., 60 watt. In the ABS mode, principally, the pump performs at its maximum output.

A circuit arrangement to control the rotational speed of a small-size d.c. motor is disclosed in EP-A-0 296 444. In this publication, the electromotive force of the generator is measured after deactivation of the motor current, and the measured value is delivered to a comparator circuit and compared with a nominal value which corresponds to the desired rotational speed. Small-size motors of this type are required for driving dental tools such as dental drills, grinders, etc.

Finally, a control circuit for a heat pump is disclosed in EP-A-0 270 474. The nominal speed value, responsive to the ambient temperature, is compared with the actual speed, and a difference signal is obtained and evaluated to adjust the speed of the motor of a compressor. There is no suggestion or hint in this publication on how to control the hydraulic pump of a brake system including anti-lock control and traction slip control by brake management.

SUMMARY OF THE INVENTION

It is an object of the present invention to overcome the above-mentioned drawbacks of a brake system including anti-lock control and traction slip control by brake management and to disclose a way of permitting an adjustment of the flow rate of the pump of a system of this type to greatly differing requirements in response to the prevailing conditions (ABS or BASR mode, road conditions, etc.) and interferences and ensuring, in addition, that, in any situation, the minimum value required for safety reasons is available. With respect to minimizing noises, the rotational speed of the pump should exceed the still sufficient value to a minor degree only. The adjustment to the instantaneous requirements should be realized with least possible effort, in any case, without the need for a rotational speed sensor.

This object may be achieved in a simple and technically advanced fashion. According to the present invention, a nominal value representative of the rotational speed of the pump is formed in a circuit; in a subsequent control circuit, a difference value is determined by comparing the nominal value with an actual value representative of the actual pump speed; from the difference value, the pulse train for the activation of the hydraulic pump is formed; and during the times of pulse break of the pulse train, the generator voltage of the pump motor is measured and evaluated as a standard of the actual value of the rotational speed of the pump.

Determining the rotational speed of the pump or the actual value of the control circuit from the generator voltage during the "off-time" of the pump or the time of the pulse break of the pump activation signal, namely the pulse train by which the pump is driven, is a particularly straightforward way to determine the actual value in consideration of all interferences. The influence of temperatures, the magnitude of the battery voltage, the load on the pump, wear, etc., (all these factors influence the rotational speed) are taken into consideration in the way the actual value is determined according to the present invention. Of course, it is favorable that there is no need for a rotational speed sensor to determine the rotational speed of the pump.

A particularly favorable circuit arrangement for implementing the method according to the present invention is described.

Further features, advantages and possible applications of the present invention can be seen in the following description of further details with reference to the accompanying drawings.

BRIEF DESCRIPTION OF THE DRAWINGS

In the drawings:

FIG. 3A is a circuit diagram of the measuring apparatus for controlling the pump motor, and FIG. 3B is a diagram showing the time variation of the pump voltage in the pulse times and the times of pulse break.

DETAILED DESCRIPTION OF THE INVENTION

Figure 1:
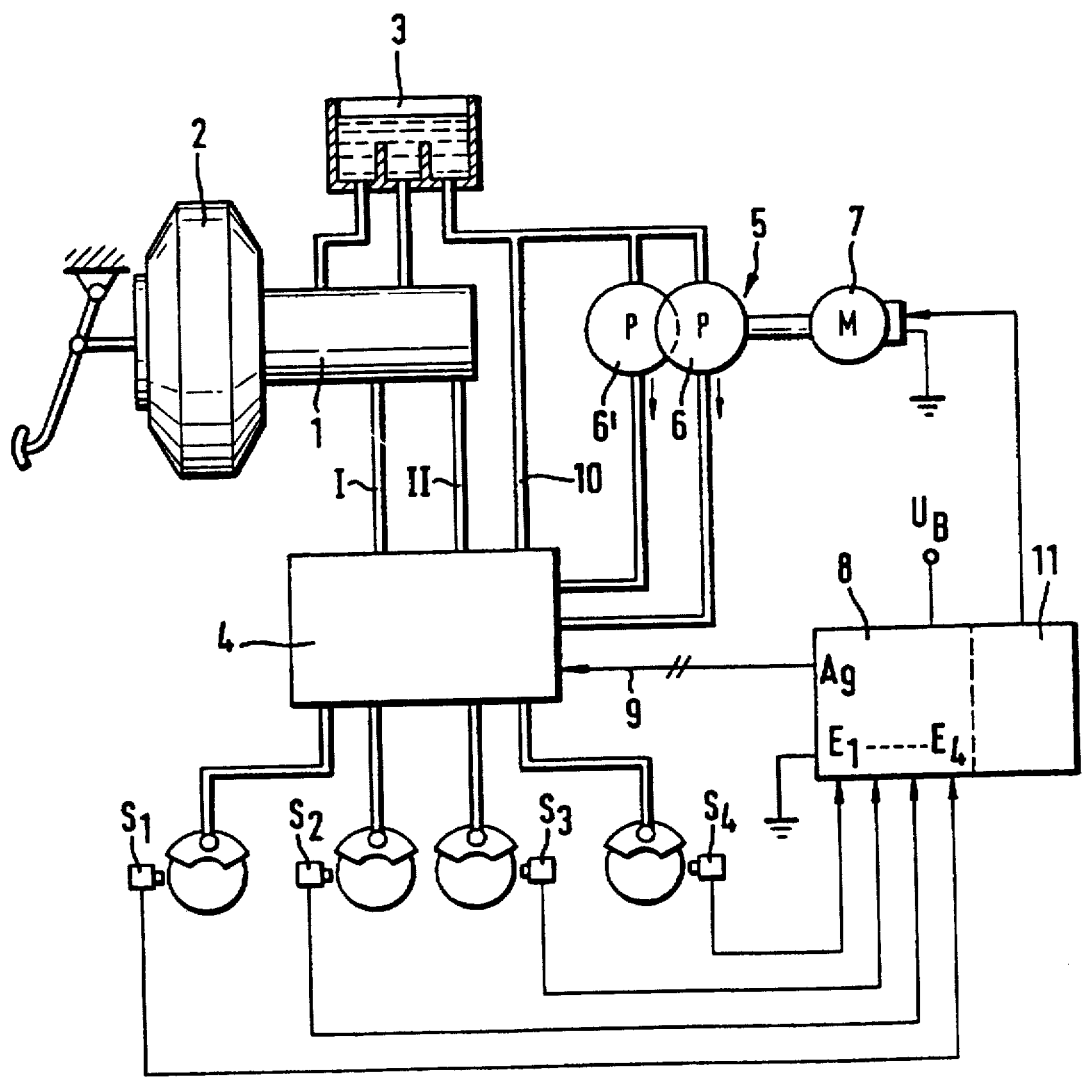
FIG. 1 is a schematic showing the most important components of a brake system including anti-lock control and traction slip control by brake management.

The brake system of FIG. 1 mainly comprises a tandem master cylinder 1 having a brake power booster 2 connected upstream of the tandem master cylinder, a pressure compensating and supply reservoir 3, and a pressure modulator 4. Further, for the generation of auxiliary pressure, there is a motor pump unit 5 including a hydraulic pump 6 and an electric drive motor 7. The master cylinder 1 has two hydraulically isolated brake circuits I, II, to which the wheel brakes are connected through hydraulic valves (not shown), for example, in a diagonal arrangement or in a black/white arrangement. A motor pump unit 5, including a dual-circuit hydraulic pump 6, 6' and a common electric drive motor 7, is provided for the auxiliary pressure supply. Thus, the brake circuits I, II are hydraulically isolated during the auxiliary pressure supply as well. Pump 6 is associated with the brake circuit I, while pump 6' is associated with the brake circuit II.

A so-called "open-center" system is shown in this embodiment, wherein the pressure fluid, which is discharged from the wheel brakes in the pressure reduction mode, flows, through a return line 10, back to the reservoir 3 of the brake system, to which the suction sides of the pumps 6, 6' also are connected. In a "closed-loop" system, to which the invention is applicable as well, the pressure fluid discharged from the wheel brakes is returned by the hydraulic pumps directly into the associated brake circuit or into the master cylinder of the brake system. Many types of brake systems with open-center and closed-loop hydraulic systems are known, so that there is no need to go into greater detail.

The brake system of FIG. 1 includes an electronic controller 8, the main purpose of which is to evaluate the data about the rotational pattern of the individual vehicle wheels, which have been gathered by means of wheel sensors $S_1$ to $S_4$, and to generate braking pressure control signals. The braking pressure control signals are directed to the braking pressure modulator 4 through an output $A_9$. A multiple line 9 is represented in FIG. 1, through which wheel valves, i.e. inlet and outlet valves, incorporated in the modulator 4, may be operated. Generally, electromagnetically operable multi-way valves are used which, depending on the control mode, keep the braking pressure in the wheel brakes constant, or reduce and re-increase the braking pressure. In the mode of traction slip control by brake management, the solenoid valves first cause closure of the pressure fluid conduit from the wheel brakes to the master cylinder 1, while then the required braking pressure is built up, by means of the hydraulic pumps 6, 6', and supplied to the driven wheels through the solenoid valves of the pressure modulator 4. The traction slip is controlled by means of the inlet and outlet valves which also serve for the anti-lock control operation.

$U_B$ represents the connection of the controller 8 and, through the controller, the pump motor 7 to the electric power supply, namely to the vehicle battery, either directly, or through a voltage regulator. The components of the circuit arrangement according to the present invention, which serve to activate the pump motor 7 and to adjust the flow rate of the pump, are comprised in a pump activation unit 11.

Figure 2:
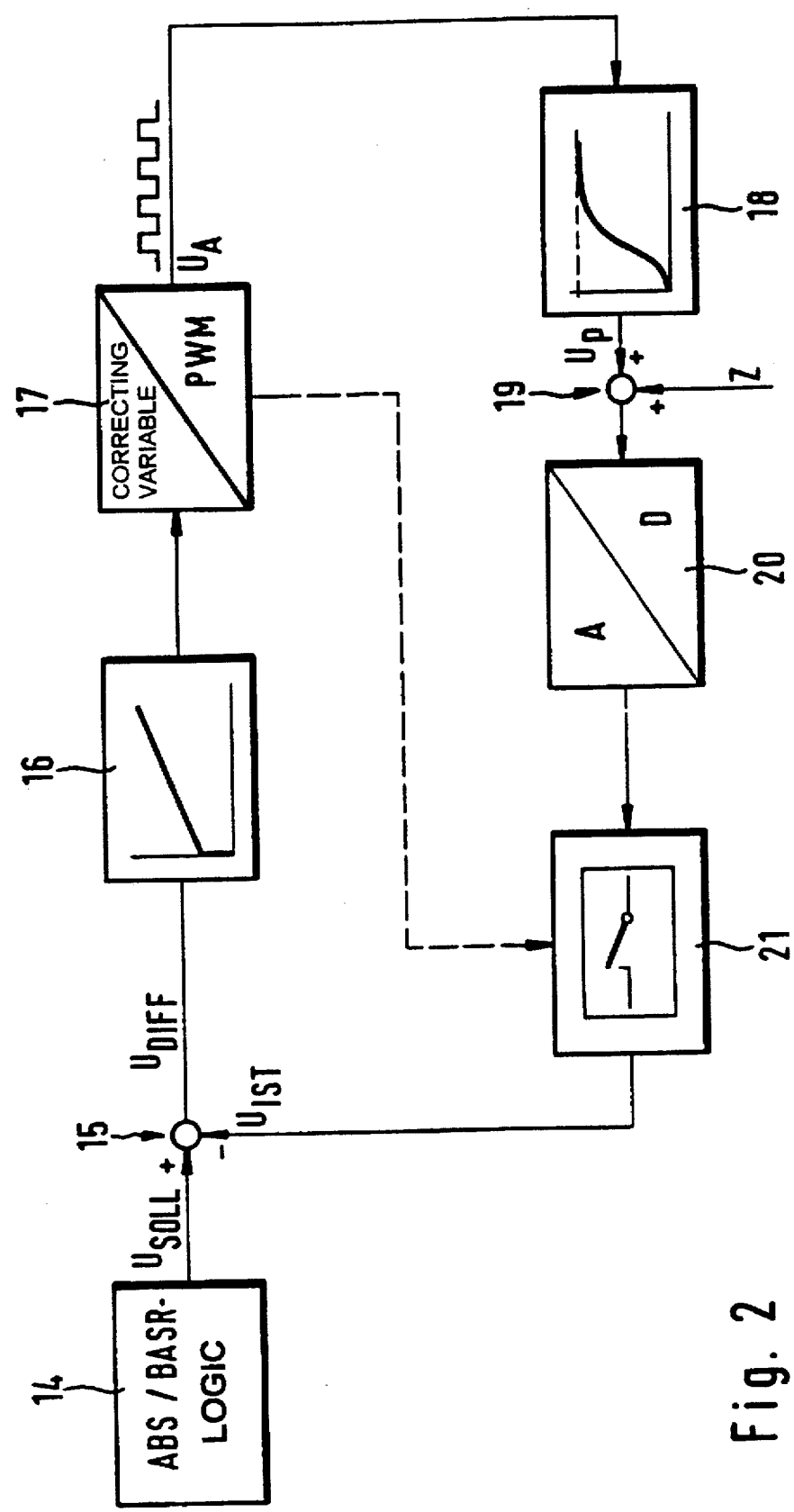
FIG. 2 is a block diagram of a control circuit for implementing the method according to the present invention.

FIG. 2 shows a control circuit for implementing the sequence of the method according to the present invention. The control circuit determines the operation of the pump activation unit 11 which, in FIG. 1, is represented as a region of the controller circuit 8 marked by dotted lines.

A circuit 14 serves to preset the nominal values of the rotational speed of the pump, namely the pump activation signal or a corresponding quantity $U_{SOLL}$. The ABS/BASR logic determines the nominal value $U_{SOLL}$. After the comparison with the corresponding actual value $U_{IST}$ at a branch point 15, a difference quantity $U_{DIFF}$ is formed, and this quantity is delivered to a control element 17 through a controller 16. The control element 17 determines the pulse train $U_A$ or the pulse times/times of pulse break of the pump activation signal. The pump motor, to which the output signal $U_A$ of the control element 17, i.e. the activation pulse train, is supplied, is represented by reference numeral 18 in the control circuit. In the present embodiment, the voltage $U_P$, which declines on the pump 18 and also includes the data about interferences Z (symbolically represented by branch point 19), after conversion by an A/D converter 20, is returned to the branch point 15 through a switch 21 and serves as a standard of the nominal value $U_{IST}$ of the rotational speed of the motor. The purpose of the element in the control circuit, represented as switch 21, is to interrupt the data path during the on-time $T_{in}$ (see FIG. 3B) of the pump motor 18 ("7" in FIG. 1) because, according to the present invention, only the generator voltage $U_{Gen}$ is evaluated during the off-time $T_{out}$ of the pump to determine the actual value $U_{IST}$.

In a preferred embodiment of the present invention, the control circuit described hereinabove is provided by programming one or a plurality of microcomputers (see FIG. 3A) or microcontrollers which determine the entire ABS and BASR control. Of course, the control may also be realized by hard-wired circuits with known provisions.

FIG. 3B shows the typical voltage variation at the terminals of the pump motor 7 when the pump is activated by a pulse train. Also, the measuring arrangement is shown in FIG. 3A. LT designates a power transistor, to the control electrode G of which the output voltage $U_A$ of the control element 17 according to FIG. 2 is applied, and which activates and deactivates the drive motor 7 of the hydraulic pump pulsed by the pulse train $U_A$. The voltage U declining on the pump, through the converter 20 (see FIG. 2), is directed to the microcontroller MP for further processing.

According to the diagram in FIG. 3B, the pump is switched on at the time $t_0$. Consequently, almost the full battery voltage $U_B$ is applied to the terminals of the pump for the interval $T_{in}$. The pulse break of the pulse train commences at the time $t_1$. The pump, which continues to operate during the times of pulse break $T_{out}$ of the activation pulse train, will now act as a generator. After a short voltage sag at the time $t_1$, a continuously decreasing voltage $U_{Gen}$ is applied to the pump terminals. The next switch-on pulse follows at the time $t_2$.

According to the present invention, the generator voltage $U_{Gen}$ is compared as the actual value $U_{IST}$ with the nominal value $U_{SOLL}$ predetermined by the ABS/BASR logic 14 (see FIG. 2). As described above, the difference $U_{DIFF}$ is evaluated in the control circuit for the correction of the pump activation pulse train.

We claim:

1. A method of adjusting the flow rate of an electromotively driven hydraulic pump having a motor for a brake system including anti-lock control (ABS) and traction slip control by brake management (BASR) to instantaneous requirements, wherein the hydraulic pump is activated by a pulse train having at least one of variable pulse times and variable times of pulse break, characterized in that a nominal value, representative of the rotational speed of the pump, is formed in a circuit, in subsequent control a circuit, a difference value is formed by comparing the nominal value with an actual value, representative of the actual pump speed, and from the difference value, the pulse train is formed for the activation of the hydraulic pump, and during the times of pulse break of the pulse train, a generator voltage of the pump motor is measured and evaluated as a standard of the actual value of the pump speed.

2. A circuit configuration for implementing the method as claimed in claim 1, charazterized in that the difference value, through a controller, is delivered to a control element which generates the pulse train for the pump activation, and in that the generator voltage, which is produced by the drive motor of the hydraulic pump during the times of pulse break, is evaluated as a standard of the actual value of the rotational pump speed and is returned for a comparison with the nominal value of the pump speed.

3. A method of adjusting the flow rate of an electromotively driven hydraulic pump having a motor for a brake system including anti-lock control and traction slip control by brake management to instantaneous requirements, said method comprising the steps of:

developing a nominal value of the rotational speed of a pump;

activating the pump by a pulse train having at least one of variable pulse times and variable times of pulse break;

developing a difference value by comparing the nominal value with an actual value of the pump speed;

from the difference value, forming the pulse train for the activation of the pump; and during the times of pulse break of the pulse train, measuring and evaluating the voltage of a motor which drives the pump as a standard of the actual value of the pump speed.

4. A circuit configuration for adjusting the flow rate of an electromotively driven hydraulic pump having a motor for a brake system including anti-lock control and traction slip control by brake management to instantaneous requirements, said circuit configuration comprising:

means for supplying a signal representative of the nominal rotational speed of a pump;

means for supplying a pulse train having at least one of variable pulse times and variable times of pulse break;

means for comparing the signal representative of the nominal rotational speed of the pump with a signal representative of the actual speed of the pump and for developing a signal representative of the difference;

means responsive to the signal representative of the difference for forming the pulse train for activation of the pump; and means for:
  (a) measuring and evaluating the voltage of a motor which drives the pump as a standard of the actual rotational speed of the pump during the times of pulse break of the pulse train, and
  (b) returning the measured and evaluated voltage for comparison with the signal representative of the nominal rotational speed of the pump.

* * * * *

UNITED STATES PATENT AND TRADE MARK OFFICE
CERTIFICATE OF CORRECTION

PATENT NO. : 5,704,766
DATED : January 6, 1998
INVENTOR(S) : Fennel et al.

It is certified that error appears in the above-identified patent and that said Letters Patent is hereby corrected as shown below:

Claim 1, column 5, line 7, after "in" insert the word --a--; after "control", delete the word --a--.

Signed and Sealed this

Twenty-fifth Day of August, 1998

*Attest:*

BRUCE LEHMAN

*Attesting Officer*   *Commissioner of Patents and Trademarks*